(12) United States Patent
Oyster et al.

(10) Patent No.: US 6,378,466 B1
(45) Date of Patent: Apr. 30, 2002

(54) SIDE RELEASE BUCKLE

(75) Inventors: Brian D. Oyster, Damascus; David R. Kerns, Hanoverton; Robert C. Holt, Jr., North Canton, all of OH (US)

(73) Assignee: Coastal Pet Products, Inc., Alliance, OH (US)

( * ) Notice: Subject to any disclaimer, the term of this patent is extended or adjusted under 35 U.S.C. 154(b) by 0 days.

(21) Appl. No.: 09/693,193

(22) Filed: Oct. 23, 2000

(51) Int. Cl.⁷ .............................................. A62B 35/00
(52) U.S. Cl. ........................................ 119/863; 24/625
(58) Field of Search ........................ 24/625, 615, 616, 24/573.1, 664, 633, 618, 634, 639, 163 K, 170, 171, 173, 191, 194, 640; 119/263

(56) References Cited

U.S. PATENT DOCUMENTS

| | | | |
|---|---|---|---|
| 3,713,192 A | * | 1/1973 | Wallin |
| 4,831,694 A | * | 5/1989 | Kong .......................... 24/625 |
| 5,355,562 A | * | 10/1994 | Matoba et al. ................ 24/625 |
| 5,561,891 A | * | 10/1996 | Hsieh ........................ 24/573.1 |
| 5,851,194 A | * | 12/1998 | Fratrick ........................ 602/28 |
| 6,041,479 A | * | 3/2000 | Colpo ........................... 24/606 |
| 6,145,172 A | * | 11/2000 | Bourdon ....................... 24/625 |

OTHER PUBLICATIONS

Two pages of photographs of a buckle from Dog & Horse Tierhaltungszubhör GmbH, Hauptstrasse 98, 42579 Heligenhaus, Germany.

* cited by examiner

Primary Examiner—Peter M. Poon
Assistant Examiner—Kevin Jakel
(74) Attorney, Agent, or Firm—Renner, Kenner, Greive, Bobak, Taylor & Weber

(57) ABSTRACT

A buckle (10) for a collar (15) includes a plug portion (11) and a socket portion (12). The plug portion (11) includes pivotable arms (35 or 47) having lugs (36 or 50) formed on the ends thereof. A spring (40 or 55) biases the outer ends of the arms (35 or 47) away from each other. The socket portion (12) has an open end (27) and opposed side openings (28). When the arms (35 or 47) are received through the open end (27), the lugs (36 or 50) will be received through the side openings (28) to attach the plug portion (11) to the socket portion (12).

25 Claims, 2 Drawing Sheets

SIDE RELEASE BUCKLE

TECHNICAL FIELD

This invention relates to a buckle for use, as an example, on a pet collar. More particularly, this invention relates to a buckle which is released simply by squeezing the sides of a male plug member which protrude through the sides of a female socket. Specifically, this invention relates to such a buckle which is made out of metal and provides more strength and endurance than other side release buckles.

BACKGROUND ART

Side release buckles which act to latch two ends of a belt, pet collar, or the like are known in the art. Such buckles take on various forms, but typically most are made of plastic having a male plug member which fits within a female socket. The socket is open at its sides to receive lugs carried at the ends of flexible arms of the plug member. Thus, as the plug is inserted into the socket, the arms flex inwardly until the lugs are allowed to snap through the open sides of the socket. As such, the buckle is engaged, but may be released by squeezing the arms together, at the location of the lugs which are exposed through the side openings, and then pulling the plug out of the socket.

Although these plastic buckles are relatively inexpensive, they offer somewhat limited strength. As such, a force applied to the buckle, as by a lunging pet, may cause the buckle to fail prematurely. Moreover, the life of such buckles can be somewhat limited in that after many flexures of the arms, such may break, rendering the buckle unusable.

Attempts to make such buckles out of metal to provide additional strength, durability and longevity have not met with complete success. In one known metallic side release buckle, two lugs are positioned at the end of the plug and two longitudinally spaced coil springs bias the lugs laterally outwardly away from each other to engage side openings in the socket. However, such does not provide any more stability than the plastic buckles in that the lugs tend to unevenly move upon forces being applied thereto; that is, due to the spaced springs, the lugs may tend to oscillate rather than move laterally upon a force being applied thereto. Moreover, this buckle requires very tedious assembly in order to properly position the springs to properly bias the lugs.

As a result, the need exists for a side release buckle which will not be susceptible to accidental release and premature failure, which is durable and not susceptible fatigue failure, and which is easy to produce and assemble.

DISCLOSURE OF THE INVENTION

It is thus an object of the present invention to provide a side release buckle for a collar or the like which is durable yet easy to produce and assemble.

It is another objection of the present invention to provide a buckle, as above, which is made of a metallic material.

It is a further object of the present invention to provide a buckle, as above, which will not accidentally release upon typically encountered forces.

These and other objects of the present invention, which will become apparent from the description to follow, are accomplished by the improvements hereinafter described and claimed.

In general, a buckle made in accordance with the present invention includes a plug portion having a housing and a socket portion having an open end and opposed side openings. The plug portion includes a first arm having one end pivotally connected to the housing and extending out of the housing, and a second arm having one end pivotally connected to the housing and extending out of the housing. A spring in the housing engages the arms to bias the other ends thereof away from each other. A lug surface is formed at the other end of each arm. When the arms are inserted through the open end of the socket portion, the lug surfaces will be received through the side openings of the socket portion to attach the plug portion to the socket portion.

In accordance with another aspect of the present invention, a collar includes a strap having first and second ends. A buckle includes a plug portion attached to the first end and a socket portion attached to the second end. The socket portion includes an open end and opposed side openings. The plug portion includes two pivotable arms having a lug formed at their outer ends, and a spring member engaging the inner ends of the arms to bias the outer ends of the arms away from each other. When the arms are inserted through the open end of the socket portion, the lugs are received through the side openings of the socket portion to close the buckle to attach the first and second ends of the strap.

Preferred exemplary buckles incorporating the concepts of the present invention are shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1:
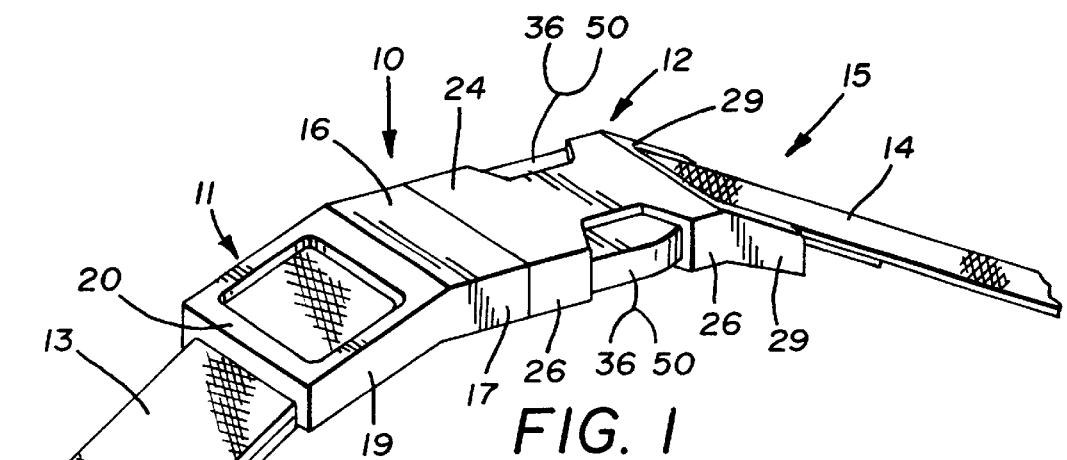
FIG. 1 is a fragmented top perspective view of a collar having a buckle made in accordance with the concepts of the present invention.

A buckle made in accordance with the present invention is generally indicated by the numeral 10 and includes a male or plug portion, generally indicated by the numeral 11, and a female portion generally indicated by the numeral 12 in FIG. 1. In the embodiment shown in FIGS. 2 and 3, these elements have been identified as 11A and 12A, respectively, and in the embodiment shown in FIGS. 4 and 5, these elements have been identified as 11B and 12B, respectively. Elements which are identical in both embodiments will be given the same reference numerals herein.

Buckles 10 are preferably made of a suitable metallic material, such as aluminum, die cast zinc, or the like, which is strong and yet lightweight. As shown in FIG. 1, buckles 10 are adapted to attach two ends 13, 14 of a continuous strapping or the like to form a belt, collar or the like generally indicated by the numeral 15. A typical collar 15 would be of the type placed around the neck of a pet and would normally include suitable hardware such that, for example, a leash could be attached to collar 15.

Figure 3:
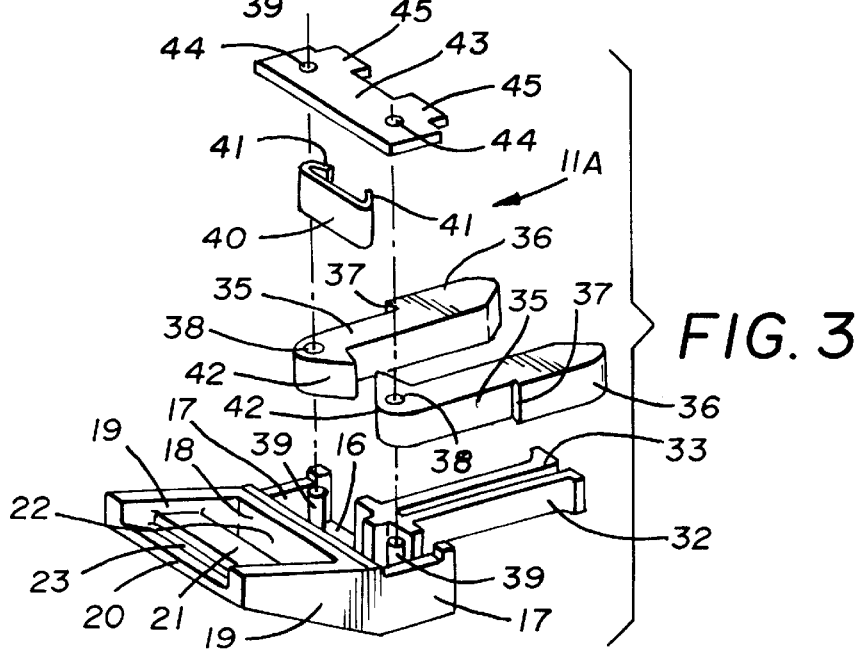
FIG. 3 is an exploded bottom perspective view of the plug portion of the buckle of FIG. 2.
Figure 5:
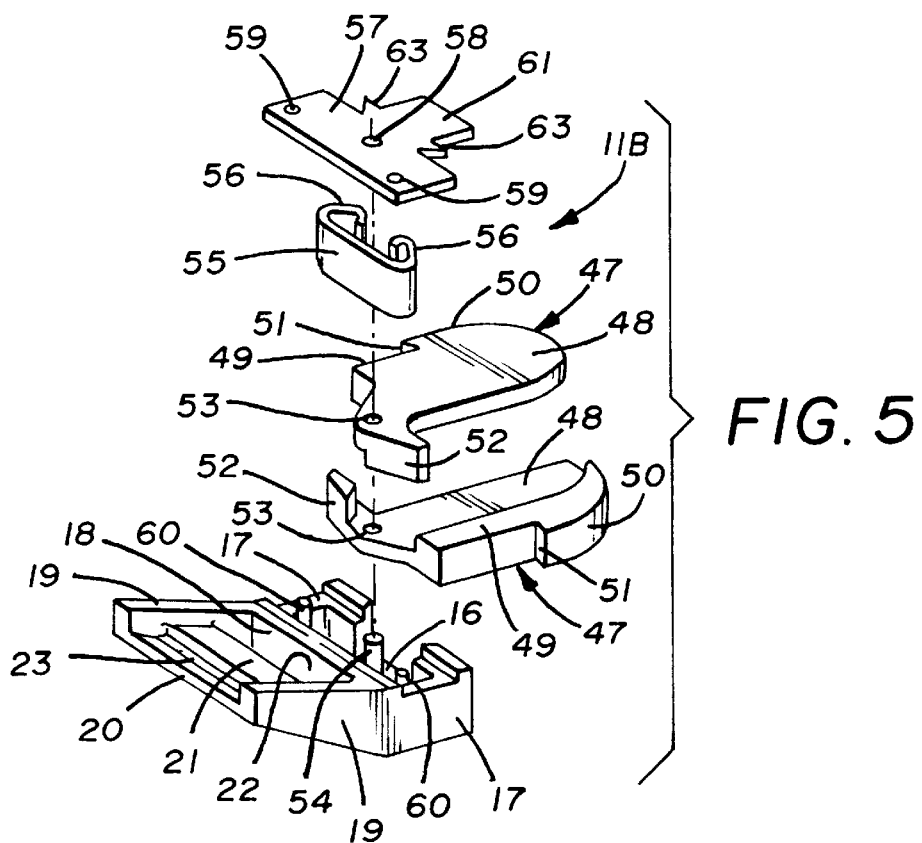
FIG. 5 is an exploded view of the plug portion of the buckle of FIG. 4.

Plug portions 11 of buckles 10 include a top surface 16 which has opposed side walls 17 extending downwardly therefrom and an outer wall 18 extending between side walls 17. As best shown in FIGS. 3 and 5, top surface 16 forms the bottom of a housing defined by walls 17 and 18 and surface 16. Side walls 17 continue outwardly, as opposed angled walls 19, the outer upper ends of which are attached by an end bar 20. A crossbar 21 also extends between angled walls 19 at generally the center of the height and length thereof, thereby forming an opening 22 between crossbar 21 and outer wall 18 and an opening 23, between crossbar 21 and end bar 20. The strap end 13 may be threaded through opening 23, then through opening 22, and be looped around crossbar 21 to thereby double back on itself where it may be stitched or otherwise fastened to itself, or be received by a conventional length adjustment assembly, thereby attaching strap end 13 to plug portion 11.

Socket portions 12 of buckles 10 include opposed, spaced top and bottom plates 24 and 25, respectively, which are interconnected by opposed spaced side walls 26. Top and bottom plates 24, 25 form, with side walls 26, a socket having an open end 27. Side walls 26 are interrupted to form opposed openings 28 therethough. The end of side walls 26 opposite to open end 27 continue outwardly as opposed angled walls 29. The outer ends of walls 29 are interconnected by an end bar 30, leaving a space 31 between the outer end of plates 24, 25 and end bar 30. The strap end 14 may be threaded through space 31 and be looped around end bar 30 to thereby double back on itself where it may be stitched or otherwise fastened to itself thereby attaching strap end 14 to socket portion 12. While this attachment is somewhat different than that described with respect to plug portion 11 and strap end 13, it should be evident that both attachments could be the same, with neither attachment system playing a part of the present invention.

Figure 2:
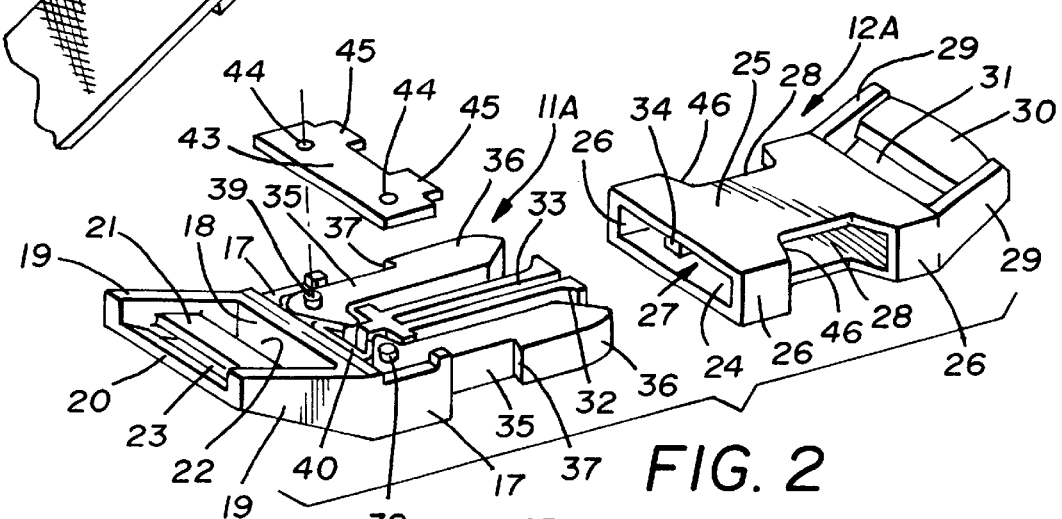
FIG. 2 is a partially exploded bottom perspective view of a buckle of the present invention showing the plug portion separated from the socket portion.

In the embodiment shown in FIGS. 2 and 3, plug portion 11A includes a guide bar 32 carried by top surface 16 and extending outwardly from the housing formed by surface 16 and walls 17 and 18. Guide bar 32 has a track 33 formed therein, and as plug portion 11A is inserted into socket portion 12A, a lug 34 carried by bottom plate 25 is received within track 33. Such assures proper alignment of plug portion 11 A and socket portion 12A, makes certain that these elements are properly oriented, and otherwise facilitates the buckling and unbuckling of the buckle.

Plug portion 11A also includes a pair of pivot arms 35 which have enlarged lug surfaces 36 formed at the outer ends thereof. Lug surfaces define lock shoulders 37 which, as will hereinafter be described, engage socket portion 12A to maintain the buckled latched. The inner ends of arms 35 are provided with apertures 38 which are received over pins 39 extending from housing surface 16. A somewhat U-shaped spring member 40 has bias arms 41 which bear against surfaces 42 of arms 35 to maintain arms 35 biased away from each other. Spring member 40 can be made of any suitable resilient material such as spring steel or a resilient plastic such as nylon, acetal or the like.

Spring member 40 and arms 35 are assembled in the housing defined by surface 16 and walls 17 and 18, as shown in FIG. 2, and a cover plate 43 maintains these elements in their proper position. To that end, cover plate 43 may be provided with apertures 44 which are received over pins 39 and held thereon, as by crimping, swaging or the like. Cover plate 43 is also shown as having tabs 45 which fit between guide bar 32 and side walls 17 to provide additional stability to the connection.

In operation of the buckle shown in FIGS. 2 and 3, when plug portion 11A is inserted into, socket portion 12A, the ends of arms 35 which extend out of the housing will move toward each other against the bias of spring member 40 until the openings 28 in socket portion 12A are reached. At this point, spring member 40 will urge arms 35 away from each other as lug surfaces 36 snap into openings 28. At that time, lock shoulders 37 will engage surfaces 46 of socket portion 12A to hold the buckle together in the condition shown in FIG. 1. To release the buckle, one need only squeeze the opposed lug surfaces 36 together to overcome the bias of spring member 40, while pulling plug portion 11A out of socket portion 12A. Of course, in both the insertion and retracting operations, lug 34 rides in track 33 of guide bar 32 to prevent any misalignment of plug portion 11A relative to socket portion 12A, and to prevent plug portion 11A from being inserted into socket portion 12A upside down, as previously described In the embodiment shown in FIGS. 4 and 5, plug portion 11B includes a pair of pivot arms, generally indicated by the numeral 47, each of which include a generally flat plate 48. Pivot arms 47 also include a side wall 49 formed at one lateral edge of plate 48. Side walls 49 are provided with enlarged lug surfaces 50 formed at the outer ends thereof, which surfaces define lock shoulders 51. A spring bearing surface 52 is formed on the other lateral edge of each plate 48 and is thus laterally spaced from and opposed to the inner end of side walls 49. The inner edge of each plate 48 is provided with an aperture 53 which apertures are received over a pin 54 extending from housing surface 16. A somewhat U-shaped spring member 55, which is similar to spring member 40 and can be made of the same material, includes bias arms 56 which bear against surfaces 52 of pivot arms 47 to maintain arms 47 biased away from each other.

Figure 4:
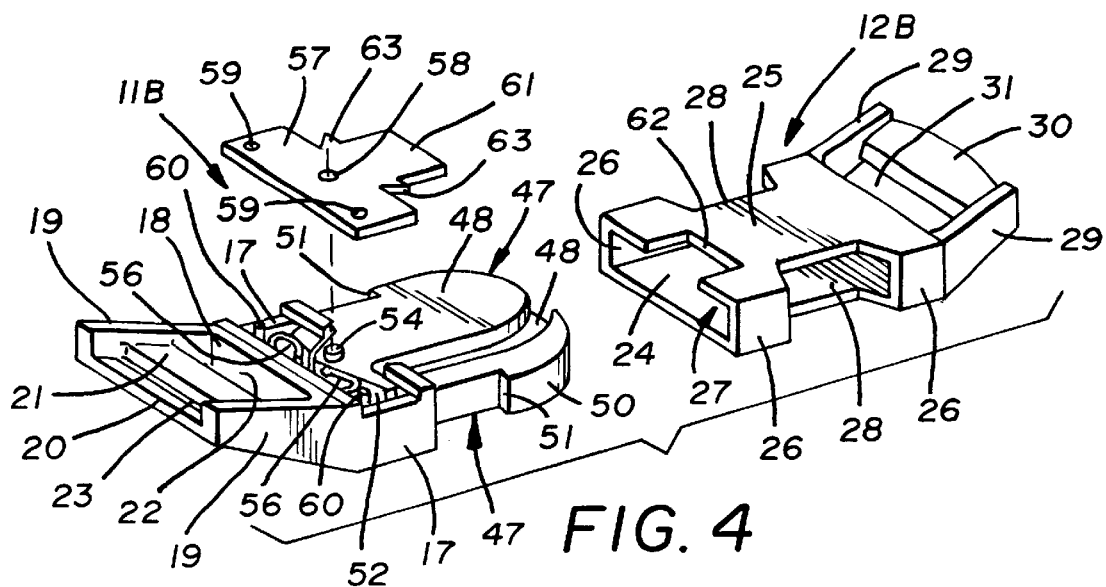
FIG. 4 is a partially exploded bottom perspective view of another embodiment of a buckle of the present invention showing the plug portion separated from the socket portion.

Spring member 40 and arms 47 are assembled in the housing defined by surface 16 and walls 17 and 18, as shown in FIG. 4. When so assembled, plates 48 of arms 47 overlie each other, which adds strength to the buckle. A cover plate 57 maintains these elements in their proper position. To that end, cover plate 57 is provided with an aperture 58, located generally centrally thereof, which may be received over pin 54. If necessary, cover plate 57 may be provided with additional apertures 59 to be received over additional pins 60 carried by housing surface 16. Plate 57, like plate 43, is thereby attached to enclose the housing, as by crimping, swaging or the like.

Cover plate 57 also includes a guide tab 61 which, as plug portion 11B is inserted into socket portion 12B, is received in a notch 62 formed in bottom plate 25 of plug portion 11B. Opposed barbs 63 may also be formed on plate 57 to contact the open end 27 of socket portion 11B. By virtue of tab 61 being received in notch 62, proper alignment of plug portion 11B and socket portion 12B is assured, and such also makes certain that these elements are properly oriented to otherwise facilitate the buckling and unbuckling of the buckle.

In operation of the buckle shown in FIGS. 4 and 5, when plug portion 11B is inserted into socket portion 12B, the ends of arms 47 which extend out of the housing will move toward each other against the bias of spring member 55 until the openings 28 in socket portion 12B are reached. At this point, spring member 55 will urge arms 47 away from each other as lug surfaces 50 snap into openings 28. At that time, lock shoulders 51 will engage surfaces 46 of socket portion 12B to hold the buckle together in the condition shown in FIG. 1. To release the buckle, one need only squeeze opposed lug surfaces 50 together to overcome the bias of spring member 55, while pulling plug portion 11B out of socket portion 12B. Of course, in both the insertion and retracting operations, tab 61 of plate 57 is received in notch 62 of socket portion 12B to locate plug portion 11B relative to socket portion 12B.

In view of the foregoing, it should be evident that a buckle as described herein, when utilized on a collar or the like, accomplishes the objects of the present invention and otherwise substantially improves the art.

What is claimed is:

1. A buckle comprising a plug portion having a housing; a socket portion having an open end and opposed side openings; said plug portion including a first arm having one end pivotally connected to said housing and extending out of said housing, a second arm having one end pivotally connected to said housing and extending out of said housing, a spring member in said housing engaging said arms to bias the other end of said arms away from each other, and a lug surface formed at the other end of each said arm, said arms being capable of being inserted through the open end of said socket portion such that said lug surfaces will be received through the opposed side openings of said socket portion to attach said plug portion to said socket portion; said lug surfaces being engageable to overcome the bias of said spring member to allow said arms to be removed through the open end of said socket portion.

2. A buckle according to claim 1 further comprising lock shoulders formed by said lug surfaces, said lock shoulders being adapted to engage said socket portion.

3. A buckle according to claim 1 wherein each one end of each said arm includes a bearing surface, and said spring member includes arms bearing against said bearing surfaces.

4. A buckle according to claim 1 further comprising a pin in said housing, said pin carrying the one end of said arms such that said arms pivot on said pin.

5. A buckle according to claim 4 further comprising a cover plate attached to said pin.

6. A buckle according to claim 4, said first arm including a flat plate, said second arm including a flat plate, said flat plate of said first arm overlying said flat plate of said second arm.

7. A buckle according to claim 6 further comprising a side wall formed on each said flat plate, said side walls carrying said lug surfaces.

8. A buckle according to claim 1 wherein said socket portion and said arms are made of a metallic material.

9. A buckle comprising a plug portion having a housing; a socket portion having an open end and opposed side openings; said plug portion including a first arm having one end pivotally connected to said housing and extending out of said housing, a second arm having one end pivotally connected to said housing and extending out of said housing, a spring member in said housing engaging said arms to bias the other end of said arms away from each other, a cover plate to maintain said arms and said spring in said housing, and a lug surface formed at the other end of each said arm, said arms being capable of being inserted through the open end of said socket portion such that said lug surfaces will be received through the opposed side openings of said socket portion to attach said plug portion to said socket portion.

10. A buckle according to claim 9, said cover plate including a tab and said socket portion including a notch, said tab being received in said notch when said plug portion is attached to said socket portion.

11. A buckle according to claim 9 further comprising at least one pin in said housing, said cover plate being attached to said pin.

12. A buckle comprising a plug portion having a housing; a socket portion having an open end and opposed side openings; said plug portion including a first arm having one end pivotally connected to said housing and extending out of said housing, a second arm having one end pivotally connected to said housing and extending out of said housing, a spring member in said housing engaging said arms to bias the other end of said arms away from each other, and a lug surface formed at the other end of each said arm, said arms being capable of being inserted through the open end of said socket portion such that said lug surfaces will be received through the opposed side openings of said socket portion to attach said plug portion to said socket portion; said plug portion including a guide bar having a track therein, and said socket portion including a lug, said lug being received in said track when said arms are received in said socket portion.

13. A buckle comprising a plug portion having a housing; first and second pins in said housing; a socket portion having an open end and opposed side openings; said plug portion including a first arm having one end pivotally carried by said first pin and extending out of said housing, a second arm having one end pivotally carried by said second pin and extending out of said housing, a spring member in said housing engaging said arms to bias the other end of said arms away from each other, and a lug surface formed at the other end of each said arm, said arms being capable of being inserted through the open end of said socket portion such that said lug surfaces will be received through the opposed side openings of said socket portion to attach said plug portion to said socket portion.

14. A buckle according to claim 13 further comprising a cover plate attached to said pins.

15. A collar comprising a strap having first and second ends; a buckle; said buckle including a plug portion attached to said first end and a socket portion attached to said second end; said socket portion having an open end and opposed side openings; said plug portion including two pivotable arms having a lug formed at their outer ends, and a spring member engaging the inner ends of said arms to bias the outer ends of said arms away from each other; said arms being capable to be inserted through the open end of said socket portion such that said lugs will be received through the opposed side openings of said socket portion to close said buckle to attach said first and second ends of said strap; said lugs being engageable to overcome the bias of said spring member to allow said arms to be removed through the open end of said socket portion.

16. A collar according to claim 15 further comprising lock shoulders formed by said lugs, said lock shoulders being adapted to engage said socket portion.

17. A collar according to claim 15 wherein the inner end of each said arm includes a bearing surface, and said spring member includes arms bearing against said bearing surfaces.

18. A collar according to claim 15 wherein said plug portion includes a housing carrying said spring member and receiving the inner ends of said arms.

19. A collar according to claim 18 further comprising a pin in said housing, said pin carrying the inner ends of said arms such that said arms pivot on said pin.

20. A collar comprising a strap having first and second ends; a buckle; said buckle including a plug portion attached to said first end and a socket portion attached to said second end; said socket portion having an open end and opposed side openings; said plug portion including two pivotable arms having a lug formed at their outer ends, and a spring member engaging the inner ends of said arms to bias the outer ends of said arms away from each other; said arms being capable to be inserted through the open end of said socket portion such that said lugs will be received through the opposed side openings of said socket portion to close said buckle to attach said first and second ends of said strap; said plug portion including a guide bar having a track therein, and said socket portion including a lug member, said lug member being received in said track when said arms are received in said socket portion.

21. A collar comprising a strap having first and second ends; a buckle; said buckle including a plug portion attached to said first end and a socket portion attached to said second end; said socket portion having an open end and opposed side openings; said plug portion including two pivotable arms having a lug formed at their outer ends, a spring member engaging the inner ends of said arms to bias the outer ends of said arms away from each other, a housing carrying said spring member and receiving the inner ends of said arms, and a cover plate to maintain said arms and said spring in said housing; said arms being capable to be inserted through the open end of said socket portion such that said lugs will be received through the opposed side openings of said socket portion to close said buckle to attach said first and second ends of said strap.

22. A collar according to claim 21, said cover plate including a tab and said socket portion;including a notch, said tab being received in said notch when said plug portion is attached to said socket portion.

23. A collar comprising a strap having first and second ends; a buckle; said buckle including a plug portion attached to said first end and a socket portion attached to said second end; said socket portion having an open end and opposed side openings; said plug portion including two pivotable arms having a lug formed at their outer ends, a spring member engaging the inner ends of said arms to bias the outer ends of said arms away from each other, a housing carrying said spring member and receiving the inner ends of said arms, and first and second pins in said housing, said first pin carrying the inner end of one said arm and said second pin carrying the inner end of the other said arm; said arms being capable to be inserted through the open end of said socket portion such that said lugs will be received through the opposed side openings of said socket portion to close said buckle to attach said first and second ends of said strap.

24. A collar according to claim 23 wherein each said arm includes a flat plate, said flat plate of one said arm overlying said flat plate of the other said arm.

25. A collar according to claim 24 further comprising a side wall formed on each said flat plate, said side walls carrying said lugs.

\* \* \* \* \*